United States Patent
Cork et al.

(10) Patent No.: US 8,218,852 B2
(45) Date of Patent: Jul. 10, 2012

(54) SYSTEM AND METHOD FOR REPAIRING COMPOSITE PARTS

(75) Inventors: Glen Paul Cork, Wichita, KS (US); Michael D. Borgman, Derby, KS (US); Darin C. Wiley, Wellington, KS (US); Richard Jacobs, Oxford, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1098 days.

(21) Appl. No.: 12/117,147

(22) Filed: May 8, 2008

(65) Prior Publication Data

US 2008/0281554 A1   Nov. 13, 2008

Related U.S. Application Data (60) Provisional application No. 60/916,700, filed on May 8, 2007.

(51) Int. Cl.

| G06K 9/00 | (2006.01) |
|---|---|
| G06K 9/48 | (2006.01) |
| G06K 9/36 | (2006.01) |
| B28B 5/00 | (2006.01) |
| B29C 70/44 | (2006.01) |
| B29C 65/00 | (2006.01) |
| B29C 73/00 | (2006.01) |
| G03F 7/00 | (2006.01) |
| G01N 21/00 | (2006.01) |

(52) U.S. Cl. ........ 382/141; 382/154; 382/199; 382/286; 264/241; 264/258; 156/58; 156/64; 156/94; 356/237.1

(58) Field of Classification Search .................. 382/199, 382/154, 286, 141; 266/241, 258; 156/58, 156/64, 94, 98; 356/237.1
See application file for complete search history.

(56) References Cited

U.S. PATENT DOCUMENTS

| 5,317,387 | A  | * | 5/1994  | Van Hengel et al. ......... 356/625 |
| 5,676,979 | A  | * | 10/1997 | Folsom et al. .................. 425/13 |
| 5,974,168 | A  | * | 10/1999 | Rushmeier et al. ........... 382/141 |
| 6,174,392 | B1 | * | 1/2001  | Reis ............................... 156/58 |
| 7,197,177 | B2 | * | 3/2007  | Lowe ............................ 382/141 |
| 2003/0052890 | A1 | * | 3/2003 | Raskar et al. ................. 345/581 |
| 2004/0151365 | A1 | * | 8/2004 | Chang et al. .................. 382/154 |
| 2004/0182492 | A1 | * | 9/2004 | Krogager et al. ............... 156/94 |

* cited by examiner

*Primary Examiner* — Kathleen Y Dulaney
(74) *Attorney, Agent, or Firm* — Hovey Williams LLP (57) ABSTRACT

A composite repair system and method for assisting in the repair of a cured composite part in which a damaged portion has been cut out and removed, exposing a plurality of composite plies and their corresponding composite ply edges. The composite repair system may comprise a light source to illuminate the ply edges, an image capturing device to obtain an image of the ply edges, and a computing device for processing the image of the ply edges and creating a map of the ply edges based on the image. The map may be used to manufacture filler plies having peripheral edges shaped to correspond with the composite ply edges for replacing the damaged portion of the composite part.

18 Claims, 5 Drawing Sheets

SYSTEM AND METHOD FOR REPAIRING COMPOSITE PARTS

RELATED APPLICATIONS

This nonprovisional patent application claims priority benefit, with regard to all common subject matter, of earlier-filed U.S. provisional patent application titled "Automated Composite Repair Using Three-Dimensional Metrology Equipment", Ser. No. 60/916,700, filed May 8, 2007. The identified earlier-filed application is hereby incorporated by reference in its entirety into the present application.

BACKGROUND

1. Field

Embodiments of the present invention relate to a system and method for repairing composite parts, such as aircraft parts and the like. More particularly, the invention relates to a system and method for creating a map of a plurality of composite ply edges. The map may be used for manufacturing and applying filler composite plies to the ply edges of the composite part, replacing a removed damaged portion of the composite part.

2. Related Art

Composite parts for use in airplanes and other applications may be made from strips of composite material laid by hand or by a numerical control (NC) machine in adjacent paths to form a composite ply. Multiple layers of ply, infused with resin and built up on top of each other, are then hardened by applying heat and pressure during a curing process. Typically each ply is comprised of fibers having a particular orientation, and each ply's fibers may have a different orientation than the orientation of the fibers of its adjacent plies. Composite parts are generally strong and light-weight. However, composite components can be expensive and time-consuming to manufacture, so it is not always cost-effective to replace a composite part when it is damaged. Therefore, methods have been developed to repair damaged sections of composite parts.

Current composite repair technology requires that an operator manually cut out the damaged area and then taper-sand the cut edge of the composite part, such that each successive adjacent ply edge extends farther inward laterally than the preceding ply edge. An operator then places a clear, tough polymeric polyester film over the taper-sanded area of the composite part and tapes the clear film to the composite part. Next, the operator traces the ply boundary, also referred to as the ply edge, for each of the taper-sanded composite plies onto the clear film with a pen. The operator must also determine and keep track of the fiber orientation for each ply. Once all boundaries are traced, small holes are cut into the clear film such that a dashed boundary pattern can be transferred from the clear film tracings to a ply of composite material. The operator then uses a pen to individually trace each of the ply boundaries from the clear film to a composite material ply for manufacturing filler plies, being careful to keep the same fiber orientation as was recorded for each corresponding ply of the composite part. Then the operator uses scissors or a knife to cut the plies along the traced lines for the filler plies. The filler plies are then placed inward of their corresponding ply boundaries and the curing process is initiated. This repair method can be mistake prone and time consuming. In addition, this method is limited in its accuracy and ability to precisely match the taper-sanded ply boundary to the filler ply's peripheral edge.

Accordingly there is a need for a method for precisely repairing a composite part does not suffer from the problems and limitations of the prior art.

SUMMARY

Various embodiments of the invention provide a composite repair system and method for assisting in the repair of a cured composite part in which a damaged portion has been cut out and removed, exposing a plurality of composite plies and their corresponding composite ply edges. The composite ply edges may be 360-degree continuous edges and may be taper sanded such that successive adjacent plies extend farther laterally than their preceding plies. The composite repair system may comprise a light source to illuminate the ply edges, an image capturing device to obtain an image of the ply edges, and a computing device for processing the image of the ply edges and creating a map of the ply edges based on the image. The map may be used to manufacture filler plies for replacing the damaged portion of the composite part.

The light source may be a single light source or a plurality of light sources which may be turned on or off in a variety of combinations. Additionally, the image capturing device may obtain one image or a plurality of images wherein various types of light or various locations of light sources are used in each of the plurality of images. The map may be based on information from a single image or from a plurality of images. Specifically, the map of the ply edges may be created based on the contrast in reflective properties of adjacent plies as displayed in the image. Also, the fiber orientation of each composite ply may be determined by the computing device based on the amount of reflection provided by the ply as displayed in the image for each mapped ply.

Some embodiments of the invention may also comprise a numerical control (NC) machine for receiving the map from the computing device to manufacture the plurality of filler plies for filling the space inward of the composite ply edges. The NC machine may manufacture each filler ply with a peripheral edge shaped such that it corresponds with the ply edge of one ply of the composite part and has the same fiber orientation as that one ply. The repair system may also comprise a projector for projecting an image of the map created by the computing device onto the ply edges. This may allow a person repairing the composite part to visually see where each ply edge is located and accurately match the filler ply with each corresponding ply edge.

These and other important aspects of the present invention are described more fully in the detailed description below.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Figure 1:
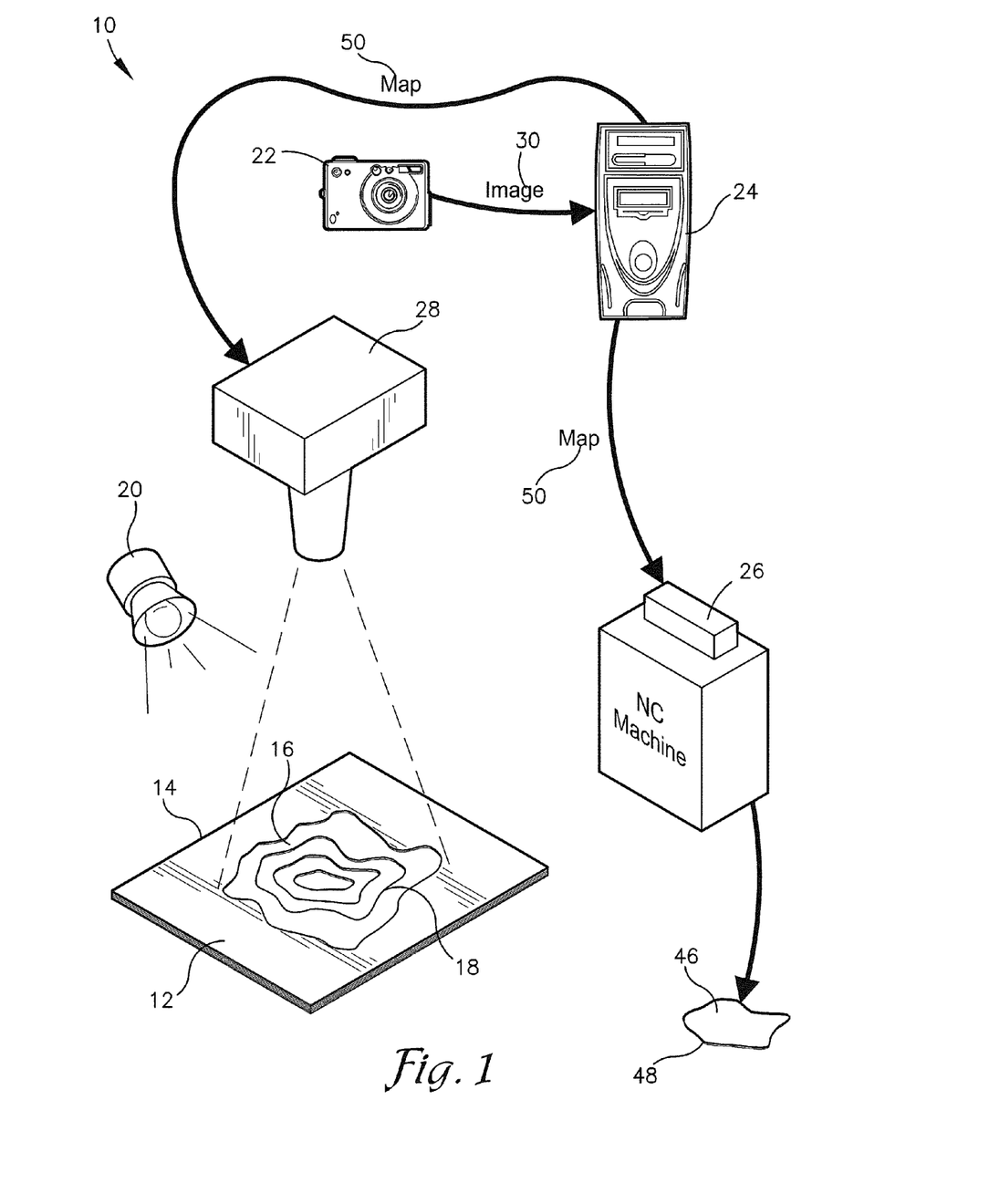
FIG. 1 is a schematic diagram of a composite part and a composite repair system according to an embodiment of the present invention.

Embodiments of the present invention, as illustrated in FIG. 1, provide a composite repair system 10 for assisting in the repair of a composite part 12 having a peripheral edge 14 and a plurality of cured composite plies 16, each having a ply boundary 18, also referred to herein as a ply edge. The composite repair system 10 may comprise a light source 20, an image capturing device 22, a computing device 24, a numerical control (NC) machine 26, and an image projecting device 28. The repair system 10 is operable to create a map 50 of the ply boundaries 18 around an area where a damaged portion of the composite part has been removed and use the map 50 to manufacture filler plies 46 for replacing the damaged portion of the composite part 12.

The cured composite part 12 to be repaired may be formed of any composite material known in the art, such as traditional composite laminates constructed of plies 16 of fiber-reinforced materials stacked on top of each other. Fiber-reinforced materials may contain a strong, stiff fiber, such as glass, boron, and graphite, embedded in a softer matrix material, such as some form of epoxy. For each individual ply 16, each fiber may be aligned at a constant angle with respect to a rectangular axes. The composite part 12 may comprise the plurality of composite plies 16 impregnated with a resin and cured by pressure and heat to bond the plies 16 together and create a strong, light-weight composite part 12. For each ply 16 of the composite part 12, the fibers may be oriented in a different direction than the fibers of its adjacent plies 16. Additionally, the ply boundaries 18 may be formed by cutting out a damaged portion of the composite part 12 and taper-sanding the resulting 360-degree ply boundaries 18 (or edges) such that each adjacent ply 16 extends further inward of the peripheral edge 14 of the composite part 12 than its preceding adjacent ply 16.

The light source 20 may be a flash on a camera, a laser light source, a light bulb, or any light source known in the art. In various embodiments of the invention, the light source 20 may produce visible light. The light source 20 may include a plurality of light sources for shining light from a variety of locations with respect to the ply boundaries 18 of the composite part 12. For example, the light sources 20 may form a ring around the ply boundaries 18 and may be turned on and off independently in a variety of combinations. By shining light onto the ply boundaries 18, reflective properties of plies 16 having various fiber orientations can be used to detect the ply boundaries 18, as discussed in greater detail below.

The image capturing device 22 may be any image capturing device known in the art, such as a digital camera, a thermal imaging camera, an infrared camera, an x-ray machine, a scanner, a laser-based scanner, etc. The image capturing device 22 may capture an image 30 of the ply boundaries 18 of the composite part 12. The image capturing device 22 may be a plurality of image capturing devices and may obtain images 30 from a plurality of locations with respect to the ply boundaries 18 of the composite part 12.

Figures 2, 3:
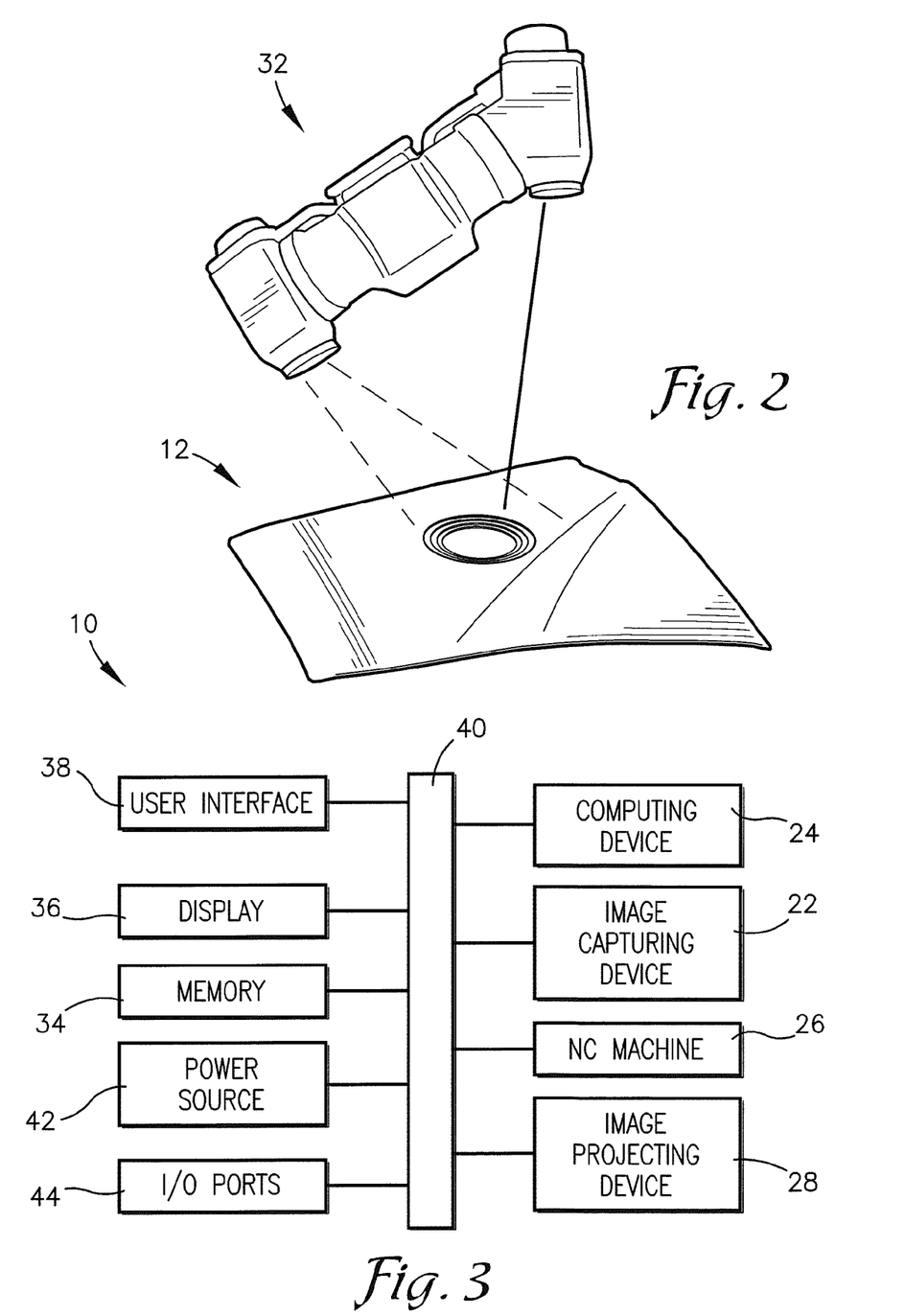
FIG. 2 is a perspective view of the composite part of FIG. 1 and an accordion fringe interferometry (AFI) device according to an embodiment of the present invention.
FIG. 3 is a block diagram illustrating certain components of the composite repair system.

For example, in various embodiments of the invention, as illustrated in FIG. 2, an accordion fringe interferometry (AFI) device 32 may be used to light and obtain images 30 of the ply boundaries 18. AFI three-dimensional imaging systems are described in detail in U.S. Pat. Nos. 5,870,191 and 6,031,612, the disclosures of which are herein incorporated by reference in their entirety. The AFI device 32 comprises two light sources 20 for illuminating the plies 16 with an interference fringe pattern, known in the art, and the image capturing device 22 for recording the curvature of the fringes from a viewpoint offset from the light sources. By using the degree of apparent fringe curvature and the known geometry between the camera and light sources, the AFI algorithms can create a map of the surface of the object being scanned. AFI-based scanners may record an XYZ surface point coordinate for every pixel of the image 30.

The computing device 24 may include any number of processors, controllers, integrated circuits, programmable logic devices, or other computing devices and resident or external memory 34 for storing data, images, and other information accessed and/or generated by the computing device 24. As illustrated in FIG. 3, the computing device 24 is preferably coupled with the image capturing device 22, a display 36, the memory 34, a user interface 38, the NC machine 26, the image projecting device 28, and other components through wired or wireless connections, such as a data bus 40, to enable information to be exchanged between the various components. The computing device 24 may also include a power source 42 and I/O ports 44, as described herein.

The computing device 24 may implement a computer program and/or code segments to perform the functions described herein. The computer program preferably comprises an ordered listing of executable instructions for implementing logical functions in the computing device 24. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 34, may be integral with the image capturing device 22, integral with the computing device 24, stand-alone memory, or a combination of both. The memory may include, for example, removable and non-removable memory elements such as RAM, ROM, flash, magnetic, optical, USB memory devices, and/or other conventional memory elements.

The memory 34 may store various data associated with the composite repair system 10, such as the computer program and code segments mentioned above, or other data for instructing the computing device 24 and system elements to perform the steps described herein. Further, the memory 34 may store various imaging parameters for interpreting and processing the image 30 obtained by the image capturing device 22. The various data stored within the memory 34 may also be associated within one or more databases to facilitate retrieval of the information.

The user interface 38 permits a user to operate the composite repair system 10 and enables users, third parties, or other devices to share information with the composite repair system 10. The user interface 38 may comprise one or more functionable inputs such as buttons, switches, scroll wheels, a touch screen associated with the display 36, voice recognition elements such as a microphone, pointing devices such as mice, touchpads, tracking balls, styluses, a camera such as a digital or film still or video camera, combinations thereof, etc. Further, the user interface 38 may comprise wired or wireless data transfer elements such as a removable memory including the memory 34, data transceivers, etc., to enable the user and other devices or parties to remotely interface with the composite repair system 10. The device may also include a speaker for providing audible instructions and feedback.

The user interface 38 may be operable to provide various information to the user utilizing the display 36 or other visual or audio elements such as a speaker. Thus, the user interface 38 enables the user and composite repair system 10 to exchange information relating to the guidance composite repair system 10, including maps 50 of the ply boundaries 18, orientation of the plies 16, images 30 received from the image capturing device 22, etc.

The power source 42 provides electrical power to various composite repair system 10 elements. For example, the power source 42 may be directly or indirectly coupled with the image capturing device 22, the computing device 24, the display 36, the memory 30, and the user interface 38. The power source 42 may comprise conventional power supply elements such as batteries, battery packs, etc. The power source 42 may also comprise power conduits, connectors, and receptacles operable to receive batteries, battery connectors, or power cables.

The I/O ports 44 permit data and other information to be transferred to and from the computing device 24 and the image capturing device 22. The I/O ports 44 may include a TransFlash card slot for receiving removable TransFlash cards and a USB port for coupling with a USB cable connected to another computing device such as a personal computer.

The NC machine 26 may be a tape-laying NC machine for manufacturing composite plies 16. Specifically, the NC machine 26 may use information from the computing device 24 regarding ply boundaries 18 and ply orientation in order to form filler plies 46 of a shape and size corresponding with the shape and size of the ply boundaries 18. This allows for precise integration of the filler plies 46 with the ply boundaries 18, such that the filler plies 46 may be used to replace the damaged portion of the composite part 12. Each filler ply 46 manufactured by the NC machine 26 may be manufactured with a peripheral edge 48 shaped such that it precisely matches up or corresponds with the composite ply boundary 18 of one ply 16 of the cured composite part 12.

The image projecting device 28, such as a laser projector, may be used to project ply boundary and ply orientation information onto the composite part 12. Specifically, the image projecting device 28 may project a ply-boundary map onto the ply boundaries 18, illuminating the ply boundaries 18 so that the operator or an automated placement machine (not shown) can be instructed as to where each of the filler plies 46 should be placed. This is useful since the ply boundaries 18 may be difficult to detect visually by the naked eye.

Figure 8:
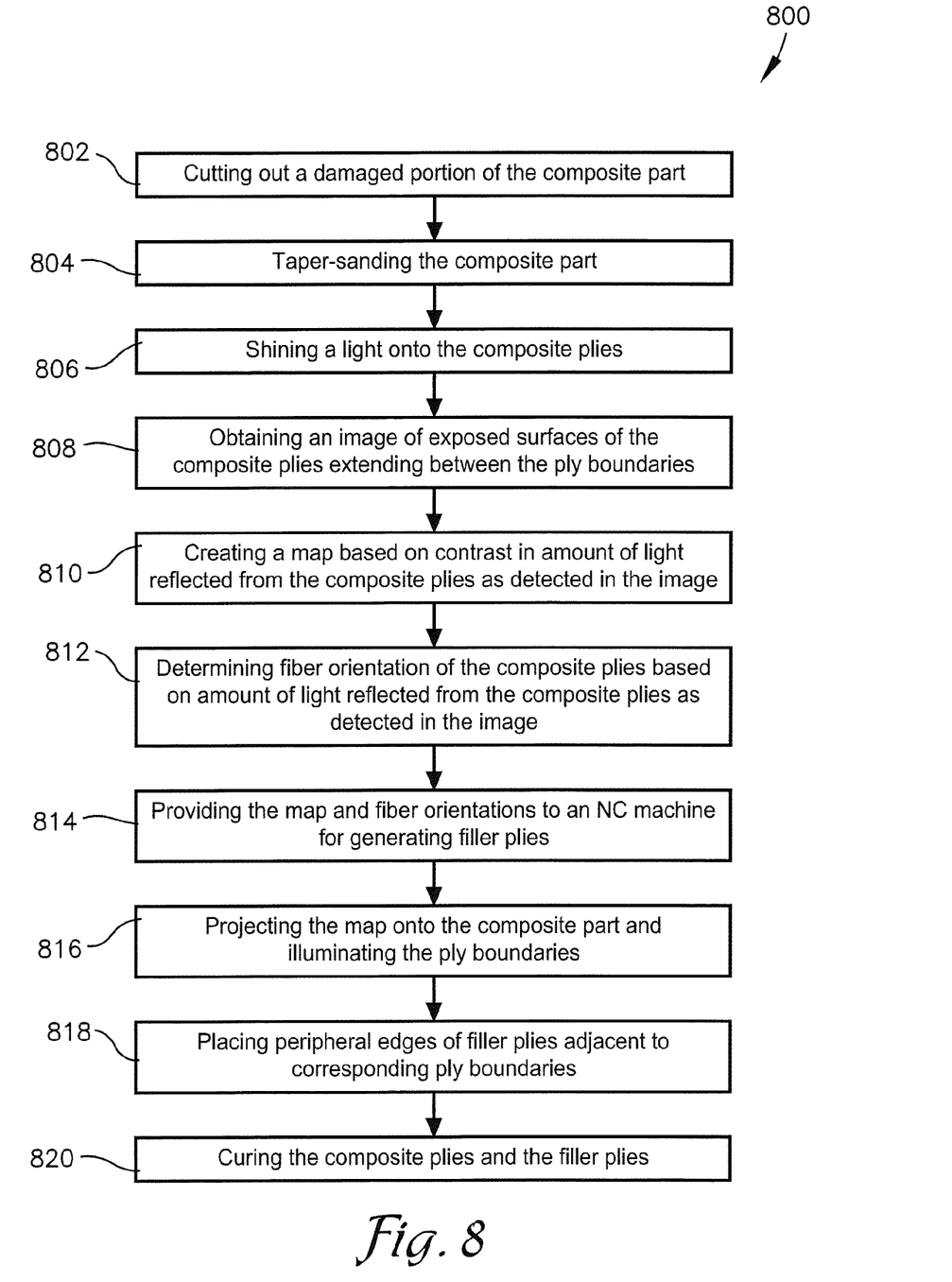
FIG. 8 is a flow chart of a method of repairing a composite part in accordance with embodiments of the present invention.

In operation, the computing device 24 may process the image 30 from the image capturing device 22 to determine information regarding ply boundaries 18 and ply orientation. The computing device 24 may then send this information to the NC machine 26, which is operable to manufacture composite filler plies 46 to replace the damaged portion of the composite part 12. Specifically, a method 800 of detecting ply boundaries to repair the composite part, as illustrated in FIG. 8, may comprise cutting out a damaged portion of the composite part 12, as depicted in block 802; taper-sanding the composite plies 16 around the 360-degree ply boundaries 18 as depicted in block 804; shining a light onto the ply boundaries 18, as depicted in block 806; obtaining the image 30 of a surface of the composite plies 16 proximate to the ply boundaries 18 with the image-capturing device 22, as depicted in block 808; creating the map 50 of the plurality of ply boundaries 18 using the computing device 24 based on the differing reflective properties of adjacent plies 16 as displayed in the image 30, as depicted in block 810; and determining the orientation of each composite ply 16 based on the reflective properties of each ply 16 as displayed in the image 30, as depicted in block 812. The method 800 may further comprise the steps of providing the map 50 and fiber orientations to the NC machine 26 for generating the filler plies 46, as depicted in block 814, projecting the map onto the composite part and illuminating the ply boundaries 18, as depicted in block 816; placing peripheral edges of the filler plies 46 adjacent to corresponding ones of the ply boundaries 18, as depicted in block 818; and curing the composite plies 16 and the filler plies 46, as depicted on block 820.

For example, if the image 30 is a grayscale image having 256 shades of gray, a large change in intensity detected between one area of the image 30 to another can be mapped as one ply boundary 18 (or ply edge). More specifically, if an intensity level of zero is detected next to an intensity level of 256, then the computing device 24 maps the boundary between these two opposite intensity levels as the ply boundary 18. This difference in luminance of plies 16 is caused by adjacent plies having different fiber orientations. For example, plies with a 90-degree fiber orientation will reflect a different amount of light than plies with a 0-degree fiber orientation. Likewise, both 90-degree fiber orientation and 0-degree fiber orientation will reflect a different amount of light than a 45-degree fiber orientation. So while the difference between intensity levels may be used to map ply boundaries 18, the actual intensity level of the ply 16 (the area between two detected ply boundaries) allows the computing device 24 to determine the fiber orientation of the ply 16. For example, the computing device 24 may be programmed to detect that a ply with a measured grayscale intensity level of 256 has a fiber orientation of 90-degrees. In general, a light and dark contrast between adjacent plies 16 as displayed in the image 30 may allow the computing device 24 to distinguish where a ply boundary 18 is located and the orientation of each composite ply 16. These examples and other specific examples of determining the fiber orientation vary depending on the camera location relative to the ply.

Figure 4:
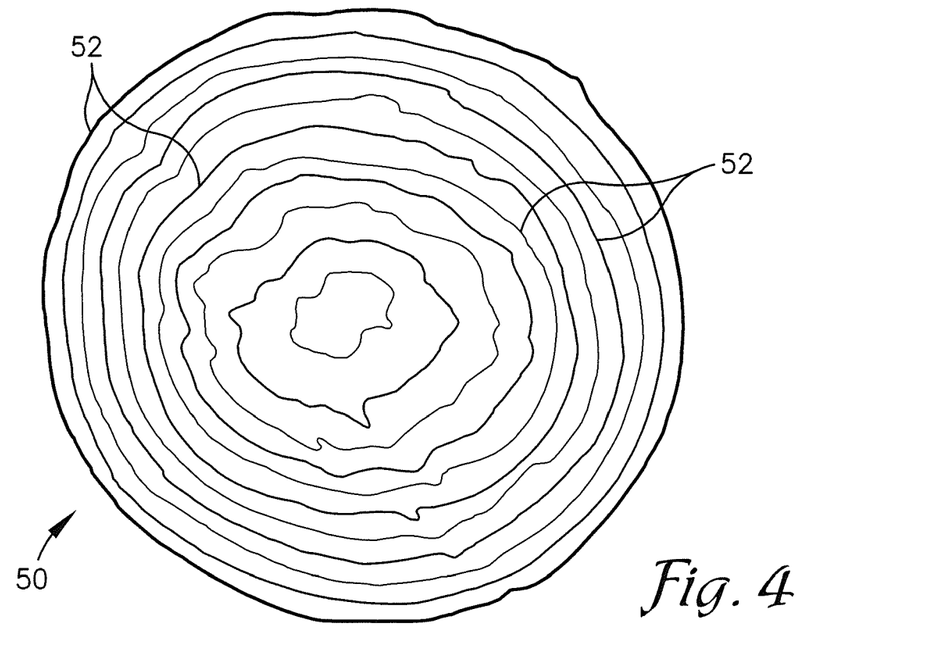
FIG. 4 is a map having splines representing ply edges of the composite part.
Figure 7:
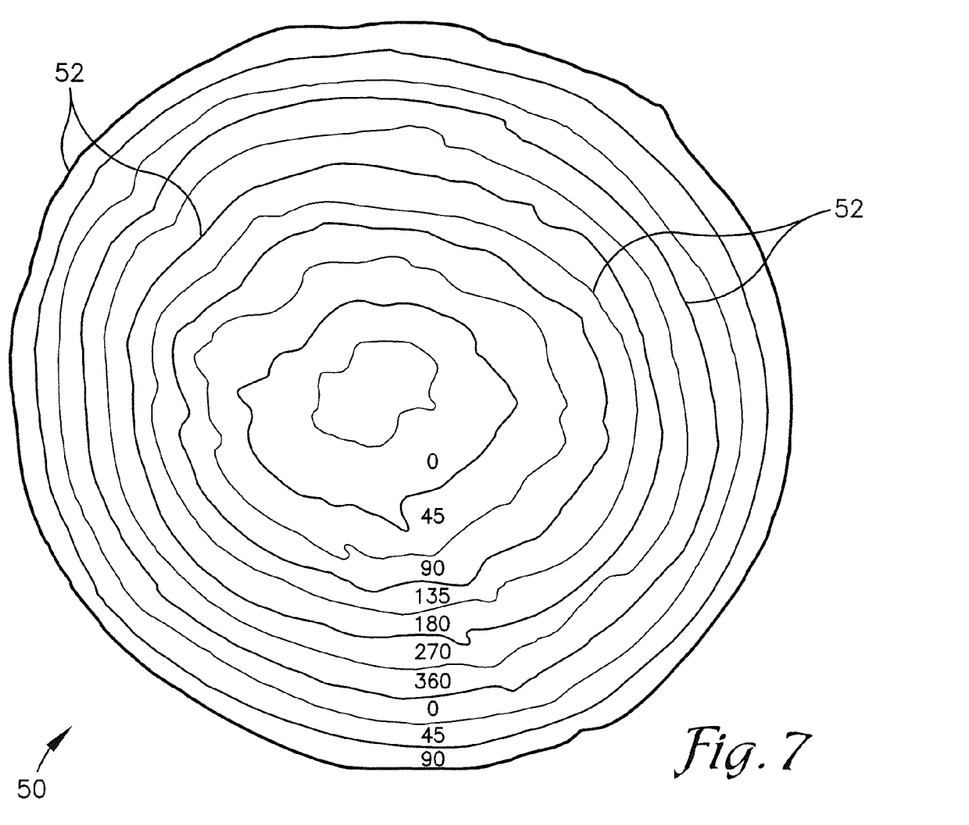
FIG. 7 is a top view of a map of the ply boundaries with fiber orientation identified thereon.

In various embodiments of the invention, the image capturing device 22 may obtain multiple images 30 from multiple angles and directions. Each image 30 may also be obtained with different light sources 20 or with the light source(s) directed at the ply boundaries 18 from different locations. This allows all portions of the 360-degree continuous ply boundaries 18 to be detected. When a ply is located at the edge of a part, the ply boundary detected may not be a full 360-degrees. The ply boundaries 18 detected in the multiple images 30 may be combined or merged into one map 50 of the ply boundaries 18 by the computing device 24 and may be displayed on the display 36 or projected onto the composite part 12, as described in greater detail below. The map 50, as illustrated in FIG. 4, may include splines 52 which trace where the computing device 24 has detected ply boundaries 18. Additionally, the computing device 24 may label the portion of each ply 16 exposed between the splines 52 according to the orientation of the fibers of the ply 16, as illustrated in FIG. 7.

The repair method of the present invention may also comprise the steps of the computing device 24 providing the orientation and ply boundary mapping information to the NC machine 26 for generating the filler plies 46 required to fill the space inward of the ply boundaries 18. The method may further comprise directly projecting the map 50 directly onto the composite part 12 with the image projecting device 28 such that the map 50 may provide location and/or orientation information for each filler ply 46 to a person or installing apparatus for installing the filler plies 46.

Figure 5:
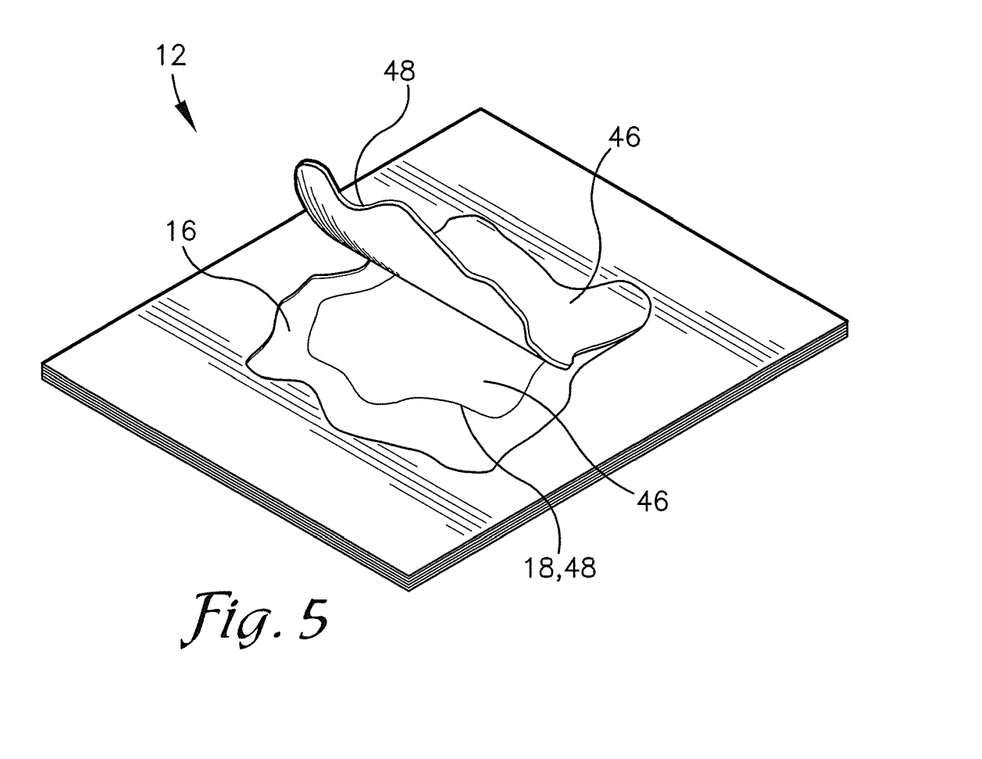
FIG. 5 is a top perspective view of the composite part with filler plies applied inward of the ply edges.
Figure 6:
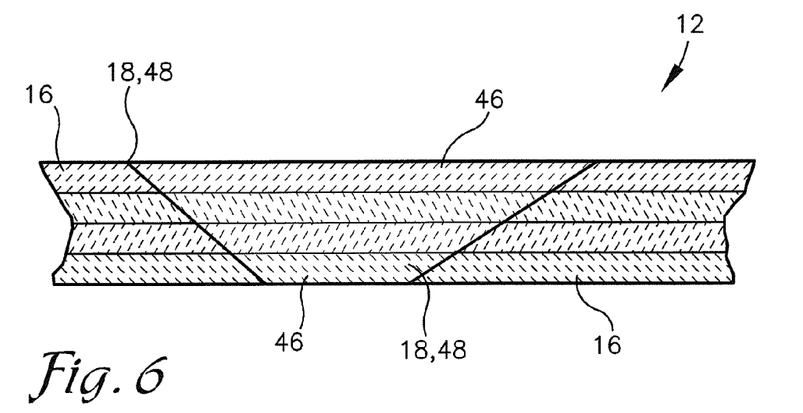
FIG. 6 is a fragmentary sectional view of the composite part with the filler plies applied inward of the ply edges.

In some embodiments of the present invention, the repair method may further include matching each filler ply 46 with its corresponding composite ply 16, as illustrated in FIGS. 5-6. As discussed, the peripheral edge 48 of each filler ply 46 may be manufactured to match the shape of its corresponding ply boundary 18 and each filler ply 46 may be manufactured to match the fiber orientation of its corresponding composite ply 16. So, guided by the image projecting device 28, a person or installing apparatus may place each filler ply 46 inward of its corresponding ply boundary 18 and then cure the entire composite part 12 and the filler plies 46 to finish the repair of the composite part 12.

Although the invention has been described with reference to the embodiments illustrated in the attached drawings, it is noted that equivalents may be employed and substitutions made herein without departing from the scope of the invention as recited in the claims. For example, in some alternative embodiments of the invention, fiber distribution, concentration, shape, and size may be also determined by the computing device 24 for the composite plies 16, in addition to fiber orientation and ply boundaries 18, based on detection of these properties in the images 30 obtained.

Having thus described an embodiment of the invention, what is claimed as new and desired to be protected by Letters Patent includes the following:

1. A computer-readable medium encoded with a computer program for repairing a composite part having a plurality of composite plies stacked on top of each other, a portion of the composite part being taper cut, thereby forming a plurality of ply boundaries of the composite plies and exposing surfaces of the composite plies between the ply boundaries, wherein the computer-readable medium is a non-transitory computer-readable medium, the computer program comprising:
    a code segment for receiving data corresponding to at least one image of the surfaces of the composite plies exposed between the ply boundaries, wherein the at least one image displays differing properties of adjacent ones of the composite plies; and
    a code segment for creating a map of the ply boundaries based on the at least one image,
    wherein each of the ply boundaries are substantially continuous ply boundaries,
    wherein the ply boundaries are taper sanded and the ply boundaries of successive adjacent ones of the composite plies extend farther inward laterally than a previous adjacent one of the composite plies.

2. The computer-readable medium of claim 1, wherein the map comprises outlines of the ply boundaries detected based on differing reflective properties of the surfaces of the composite plies exposed between the ply boundaries due to varying fiber orientations of each successive adjacent composite ply.

3. The computer-readable medium of claim 1, the computer program further comprising a code segment for instructing a numerical control (NC) machine to generate each of a plurality of filler plies for filling a space inward of the ply boundaries based on the map of the ply boundaries, wherein the NC machine manufactures each filler ply with a peripheral edge shaped to correspond with a ply boundary of one of the plies of the composite part.

4. The computer-readable medium of claim 1, the computer program further comprising a code segment for sending the map to an image projecting device for projecting an image of the map onto the composite part and illuminating the ply boundaries.

5. The computer-readable medium of claim 1, wherein the map also includes an orientation of fibers for each of the composite plies depending on an amount of light reflected by each of the composite plies.

6. The computer-readable medium of claim 1, wherein the at least one image is received from a digital imaging device.

7. The computer-readable medium of claim 1, wherein the at least one image is a plurality of digitally captured images of the composite plies and the ply boundaries, each captured while at least one of a plurality of light sources is shining on the composite plies and the ply boundaries from at least one of a plurality of locations.

8. The computer-readable medium of claim 7, wherein each of the plurality of light sources can be turned on or off independently and each of the plurality of images are captured while various combinations of light sources are on or off.

9. A method of detecting continuous ply boundaries of a plurality of composite plies of a cured composite part to repair the composite part, the method comprising:
    shining a light onto the composite plies at or proximate to the ply boundaries of the cured composite part;
    obtaining an image of taper-sanded exposed surfaces of the composite plies extending between the ply boundaries with an image-capturing apparatus;
    creating a map, with a computing device, of the ply boundaries based on the contrast between adjacent ones of the composite plies in an amount of light reflected by each of the exposed surfaces of the composite plies as detected in the image; and
    determining a fiber orientation of each of the composite plies, with the computing device, based on the amount of light reflected by each of the exposed surfaces of the composite plies as detected in the image.

10. The method of claim 9, wherein successive adjacent composite plies have differing fiber orientations and plies with a fiber orientation other than 0-degrees reflect a different amount of light than plies with a 0-degree fiber orientation.

11. The method of claim 9, wherein each of the ply boundaries of the cured composite part form a substantially continuous boundary inward of an outer periphery of the cured composite part.

12. The method of claim 11, further comprising obtaining multiple images of the composite plies at or proximate to the ply boundaries, with light shining from different directions for each image.

13. The method of claim 12, wherein the image-capturing apparatus obtains each image from a different location with respect to the composite ply boundaries.

14. The method of claim 11, further comprising providing the map and the fiber orientations of each of the composite plies to a numerical control (NC) machine for generating each of a plurality of filler plies configured to fill space inward of the ply boundaries, wherein each of the filler plies manufactured by the NC machine has a peripheral edge shaped to correspond with one of the ply boundaries of a corresponding one of the composite plies and has the same fiber orientation as the corresponding one of the composite plies.

15. The method of claim 14, further comprising projecting the map directly onto the composite part and illuminating the ply boundaries with an image projector, wherein the map projected onto the ply boundaries is configured to guide a person or an installing apparatus as to where each of the filler plies should be placed.

16. The method of claim 15, further comprising placing the peripheral edge of one of the filler plies adjacent to a corresponding one of the ply boundaries and curing the composite part and the filler plies.

17. The method of claim 11, further comprising taper sanding the composite part at the ply boundaries such that each successive adjacent one of the ply boundaries extends farther inward from an outer periphery of the composite part than a preceding adjacent one of the ply boundaries.

18. A method of detecting a plurality of substantially continuous ply boundaries of a plurality of composite plies of a composite part to be repaired, wherein the ply boundaries are formed by removing a damaged portion of the composite part and taper-sanding the ply boundaries, wherein the ply boundaries are inward of an outer periphery of the composite part and wherein each successive adjacent one of the composite plies has a different fiber orientation than an immediately preceding one of the composite plies, the method comprising:

shining a light onto the composite plies at or proximate to the ply boundaries;

obtaining an image of a surface of the composite plies exposed by taper sanding of the ply boundaries with an image-capturing apparatus;

creating a map of the ply boundaries based on detected contrast in reflective properties of adjacent ones of the composite plies as displayed in the image;

determining a fiber orientation of each of the composite plies based on an amount of reflection of each of the composite plies as displayed in the image;

providing the map and the fiber orientations of each of the composite plies to a numerical control (NC) machine configured for generating each of a plurality of filler plies for filling a space inward of the ply boundaries, wherein each of the filler plies has a peripheral edge shaped to mate with one of the ply boundaries of a corresponding one of the composite plies such that a fiber orientation of each of the filler plies is the same as a fiber orientation of the corresponding one of the composite plies; and placing each filler ply peripheral edge adjacent the ply boundaries of the corresponding one of the composite plies and curing the composite part and the filler plies.

* * * * *